United States Patent
Barowski et al.

(10) Patent No.: US 11,847,835 B2
(45) Date of Patent: Dec. 19, 2023

(54) DEVICE AND METHOD FOR IDENTIFYING AND/OR REPRESENTING A SIGNALING UNIT

(71) Applicant: Bayerische Motoren Werke Aktiengesellschaft, Munich (DE)

(72) Inventors: Thomas Barowski, Munich (DE); Frank Herchet, Neufahrn b. Freising (DE); Markus Kraemer, Dachau (DE); Michel Lanz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/872,170

(22) Filed: Jul. 25, 2022

(65) Prior Publication Data
US 2023/0022360 A1    Jan. 26, 2023

(30) Foreign Application Priority Data
Jul. 26, 2021   (DE) .................. 10 2021 119 319.2

(51) Int. Cl.
*G06V 20/58*    (2022.01)
*G05D 1/02*     (2020.01)

(52) U.S. Cl.
CPC ......... *G06V 20/582* (2022.01); *G05D 1/0221* (2013.01); *G06V 20/584* (2022.01); *B60W 2555/60* (2020.02); *B60W 2556/40* (2020.02)

(58) Field of Classification Search
CPC .. G06V 20/582; G06V 20/584; G05D 1/0221; B60W 2556/40; B60W 2555/60
See application file for complete search history.

(56) References Cited

U.S. PATENT DOCUMENTS

| | | | |
|---|---|---|---|
| 2015/0012172 A1 | 1/2015 | Hegemann et al. | |
| 2018/0307925 A1 | 10/2018 | Wisniowski et al. | |
| 2020/0401824 A1* | 12/2020 | Hayashi | G08G 1/0125 |
| 2022/0017115 A1* | 1/2022 | Biala | B60W 30/18154 |
| 2022/0141368 A1* | 5/2022 | Herman | H04N 5/2353 |
| | | | 348/207.99 |

(Continued)

FOREIGN PATENT DOCUMENTS

| | | |
|---|---|---|
| CN | 112101221 A | 12/2020 |
| DE | 10 2012 108 862 A1 | 5/2014 |
| DE | 10 2018 109 366 A1 | 10/2018 |

(Continued)

OTHER PUBLICATIONS

Japanese-language Office Action issued in Japanese Application No. 2022-103388 dated Sep. 21, 2022 with English translation (five (5) pages).

(Continued)

*Primary Examiner* — Peter D Nolan
*Assistant Examiner* — Demetra R Smith-Stewart
(74) *Attorney, Agent, or Firm* — Crowell & Moring LLP (57) ABSTRACT

A device for identifying a signaling unit on a road on which a vehicle is traveling is described. The device is configured to determine an arrangement of one or more signal signs of the signaling unit on the basis of environmental data of one or more environmental sensors of the vehicle. The device is further configured to assign the one or more signal signs to one or more corresponding grid cells of a signal sign grid based on assignment logic.

17 Claims, 3 Drawing Sheets

(56) References Cited

U.S. PATENT DOCUMENTS

2022/0277192 A1* 9/2022 Gou .................. G06N 3/10

FOREIGN PATENT DOCUMENTS

| DE | 10 2019 004 750 A1 | 2/2020 |
| EP | 3 457 317 A1 | 3/2019 |
| JP | 2019-53619 A | 4/2019 |
| JP | 2021-2275 A | 1/2021 |

OTHER PUBLICATIONS

German-language Office Action issued in German Application No. 10 2021 119 319.2 dated Sep. 9, 2022 with English translation (nine (9) pages).

German-language Search Report issued in German Application No. 10 2021 119 319.2 dated Jan. 27, 2022 with partial English translation (10 pages).

* cited by examiner

DEVICE AND METHOD FOR IDENTIFYING AND/OR REPRESENTING A SIGNALING UNIT

CROSS REFERENCE TO RELATED APPLICATION

This application claims priority under 35 U.S.C. § 119 from German Patent Application No. 10 2021 119 319.2, filed Jul. 26, 2021, the entire disclosure of which is herein expressly incorporated by reference.

BACKGROUND AND SUMMARY

The invention relates to a device and a corresponding method for identifying and/or representing or describing a signaling unit.

A vehicle can have one or more driving functions that support the driver of the vehicle in guidance, in particular in longitudinal guidance and/or transverse guidance, of the vehicle. An exemplary driving function for supporting the longitudinal guidance of a vehicle is the adaptive cruise control (ACC) function, which can be used to longitudinally guide the vehicle at a fixed target driving speed and/or at a fixed target distance from a vehicle driving ahead of the vehicle. The driving function can also be used in connection with a signaling unit (in particular traffic lights) at a traffic junction (for example at a crossroad) in order to effect an automated longitudinal guidance, for instance an automated deceleration, at the signaling unit.

A signaling unit can have different signal generators (in particular traffic lights) each having one or more signal signs, wherein the different signal generators are assigned for example to different driving directions at a traffic junction. Within the context of a driving function, only the one or more signal generators that are relevant to the driving direction planned by the driver of the vehicle or to the driving maneuver planned by the driver of the vehicle should be taken into account.

The present document deals with the technical problem of identifying and/or describing a signaling unit in an efficient, precise and reliable manner, in particular in order to increase the quality of a driving function for automated longitudinal guidance of a vehicle at a junction.

This object is achieved by each individual independent claim. Advantageous embodiments are described inter alia in the dependent claims. It is pointed out that additional features of a patent claim dependent on an independent patent claim, without the features of the independent patent claim or in combination only with a subset of the features of the independent patent claim, may form a standalone invention independent of the combination of all of the features of the independent patent claim that may be made into the subject matter of a dependent claim, a divisional application or a subsequent application. This applies in the same way to technical teaching described in the description, which may form an invention independent of the features of the independent patent claims.

One aspect describes a device for identifying and/or representing a signaling unit. The device can be adjusted, in particular, to describe a signaling unit within and/or having a data structure that enables efficient and precise use of data relating to the signaling unit, for instance within the context of a vehicle function, in particular a driving function, of a vehicle.

A signaling unit comprises one or more (individual) signal signs. In this case, a signal sign can typically be activated or deactivated individually. A preferred example of a signal sign is a signal light (which can be activated or deactivated individually). One or more signal signs can be part of a signal generator (for example a traffic light) of the signaling unit. A signal generator (and consequently the one or more signal signs of the signal generator) can be associated with a particular function. The function can comprise the control of traffic in a particular lane and/or in a particular driving direction (at a traffic junction). For example, the traffic can be stopped (for example when the signal generator exhibits a signal sign with a red color) or the flow of traffic can be permitted (for example when the signal generator exhibits a signal sign with a green color, or when all of the signal signs of the signal generator are inactive).

A signaling unit may thus comprise one or more signal generators each having one or more signal signs. In this case, a signal generator may be associated with a function, in particular with a function for vehicles turning left, vehicles turning right and/or vehicles traveling straight ahead. In a preferred example, the signaling unit comprises, in particular is, a light signal system (having one or more traffic lights). A signal sign may then be a light of the light signal system, in particular a light of a traffic light of the light signal system.

A signaling unit can be arranged on a road on which a vehicle is traveling, for example on an approach to a traffic junction (for example a crossroad or a roundabout).

The device is configured to determine an arrangement of one or more signal signs of a signaling unit in particular on the basis of environmental data of one or more environmental sensors (for example a camera) of a vehicle. The vehicle may for example head toward the signaling unit on a road. Sensor data (that is to say environmental data) in relation to the signaling unit can then be acquired using one or more environmental sensors. The environmental data can be evaluated (for example based on an object identification algorithm). Within the context of the evaluation of the environmental data, the one or more signal signs can be identified as individual objects. Furthermore, it is possible to determine how the one or more signal signs are positioned relative to one another spatially, in particular on a two-dimensional projection surface. An arrangement of one or more signal signs for a signaling unit can thus be determined (based on an object identification algorithm), wherein the arrangement

- indicates the individual signal signs of the signaling unit (for example in each case as a "bounding box" that surrounds the respective signal sign);
- indicates (for example within a two-dimensional projection surface) how the individual signal signs are arranged relative to one another. In this case, for example the offset between the individual signal signs along the horizontal axis and/or along the vertical axis can be given.

The device is further configured to assign the one or more signal signs of the determined arrangement to one or more corresponding grid cells of a signal sign grid based on assignment logic. The signal sign grid may in this case comprise a (possibly predefined) number M of columns, in particular where $M \geq 5$, and/or a (possibly predefined) number N of rows, in particular where $N \geq 5$. In particular, the signal sign grid can have $M \times N$ grid cells for a corresponding number of different signal signs. The value of N and/or M can in this case be defined in advance. As an alternative, the value of N and/or M can be adjusted flexibly to the signaling unit to be described in each case. The specifically used values of N and/or M (in a predetermined data field) can then be displayed in the data structure.

The device can be configured to assign each signal sign of the determined arrangement of one or more signal signs in each case to exactly one grid cell of the signal sign grid in a one-to-one assignment.

The arrangement of different signal signs that is determined for a signaling unit can thus be represented by a grid in which each individual grid cell represents at most exactly one signal sign of the signaling unit. A signaling unit can thus be described using a data structure that can be processed in an efficient, reliable and robust manner, for example in order to increase the quality of a vehicle function.

The assignment of the individual signal signs to the individual grid cells can be carried out according to predefined assignment logic that has one or more assignment rules. The quality of the evaluation of the data structure that represents the signaling unit can thus be increased further.

Within the context of the assignment, the device can be configured to assign the one or more signal signs along the horizontal direction (or axis) to a set of columns of the signal sign grid. In this case, the one or more following assignment rules can be used. In particular, the device can be configured to assign the one or more signal signs along the horizontal direction to the set of columns of the signal sign grid in such a way that, for all signal signs of the determined arrangement of one or more signal signs, it holds true that signal signs that are offset from one another along the horizontal direction with an offset less than or equal to an offset threshold value are assigned to the same column, and/or signal signs that are offset from one another along the horizontal direction with an offset greater than the offset threshold value are assigned to different columns.

The individual signal signs can have a particular diameter and/or a particular edge length. The offset threshold value may be for example 10% or less of the diameter and/or the edge length of the individual signal signs.

The assignment to different columns can thus be carried out in such a way that signal signs that are essentially arranged on a common vertical straight line are assigned to the same column and/or signal signs that are not arranged on a common vertical straight line are assigned to different columns. In this case, the fact that two signal signs are arranged in different columns possibly indicates that the offset between both signal signs is greater than the offset threshold value. However, the exact value of the offset is typically not clear from the column assignment.

As an alternative or in addition, the device can be configured to assign the one more signal signs along the horizontal direction to the set of columns of the signal sign grid in such a way that the signal sign that is arranged furthest to the left along the horizontal direction is assigned to the first column of the signal sign grid. As an alternative, the device can be configured to assign the one more signal signs along the horizontal direction to the set of columns of the signal sign grid in such a way that the signal sign that is arranged furthest to the right along the horizontal direction is assigned to the last column of the signal sign grid.

As an alternative or in addition, the device can be configured to assign the one or more signal signs along the horizontal direction to the set of columns of the signal sign grid in such a way that the signal signs are assigned to different, in each case directly adjacent columns of the signal sign grid according to the order in which the signal signs are offset from one another along the horizontal direction.

It is thus possible to use one or more of the aforementioned assignment rules in order to assign the one or more signal signs of the signaling unit to one or more grid cells in one or more different columns. It is correspondingly possible to use one or more of the following (corresponding) assignment rules in order to assign the one or more signal signs of the signaling unit to one or more grid cells in one or more different rows.

The device can thus be configured to assign the one or more signal signs along the vertical direction (or axis) to a set of rows of the signal sign grid. For this purpose, the device can be configured to assign the one or more signal signs along the vertical direction to the set of rows of the signal sign grid in such a way that, for all signal signs of the determined arrangement of one or more signal signs, it holds true that signal signs which are offset from one another along the vertical direction with an offset less than or equal to an offset threshold value are assigned to the same row, and/or signal signs which are offset from one another along the vertical direction with an offset greater than the offset threshold value are assigned to different rows. The offset threshold value may be for example 10% or less of the diameter and/or the edge length of the individual signal signs.

The assignment to different rows can thus be carried out in such a way that signal signs that are essentially arranged on a common horizontal straight line are assigned to the same row and/or signal signs that are not arranged on a common horizontal straight line are assigned to different rows. In this case, the fact that two signal signs are arranged in different rows possibly indicates that the offset between both signal signs is greater than the offset threshold value. However, the exact value of the offset is typically not clear from the row assignment.

As an alternative or in addition, the device can be configured to assign the one or more signal signs along the vertical direction to the set of rows of the signal sign grid in such a way that the signal sign arranged furthest to the top along the vertical direction is assigned to the first row of the signal sign grid, or the signal sign arranged furthest to the bottom along the vertical direction is assigned to the bottommost row of the signal sign grid.

As an alternative or in addition, the device can be configured to assign the one or more signal signs along the vertical direction to the set of rows of the signal sign grid in such a way that the signal signs are assigned to different, directly adjacent rows of the signal sign grid according to the order in which the signal signs are offset from one another along the vertical direction.

The device can be configured to determine sign information, in particular on the basis of the environmental data for a signal sign of the determined arrangement of one or more signal signs. The sign information can be determined on the basis of the environmental data for example based on an image analysis algorithm. The sign information can in this case indicate:

the signaling state of the signal sign, such as for example active or inactive, and where applicable the color of the signal sign; and/or the association of the signal sign to a signal generator; and/or the function of the signal sign (for example control of the traffic in a particular lane; control of the traffic for vehicles turning left, vehicles turning right or vehicles driving straight ahead).

The sign information can be stored in the signal sign grid together with the grid cell of the signal sign (for example as an attribute of the grid cell). In a corresponding manner, it is possible to determine sign information for all signal signs of the signaling unit and to provide the sign information in connection with the signal sign grid. The accuracy of the description of the signaling unit can thus be increased further (as a result of which the quality of a vehicle function can be increased further).

The device can be configured to transmit the signal sign grid for the signaling unit to a vehicle-external unit, in particular to train a digital map in relation to different signaling units in a road network. The signal sign grid determined by the device can thus be used as a basis for the description of the signaling unit in a digital map for a road network. A particularly precise digital map can thus be trained.

As already set out further above, the device can be configured to provide and/or operate a vehicle function of the vehicle, in particular a vehicle function for at least partly automated guidance of the vehicle, on the basis of the determined signal sign grid for the signaling unit. The structured description of the individual signal signs (and associated sign information) in a matrix-like grid in this case enables particularly reliable and robust operation of the vehicle function.

The device can be configured to compare the determined signal sign grid for the signaling unit with a reference grid for the signaling unit from the digital map in relation to the road network on which the vehicle is traveling. The reference grid can have been determined and/or provided by the vehicle-external unit described in this document. The reference grid preferably has the same structure as the signal sign grid, with the result that the comparison is carried out in a particularly efficient and isolated manner for corresponding grid cells of the two grids. A vehicle function can then be provided and/or operated in a particularly reliable and robust manner depending on the comparison.

Another aspect describes a data structure for representing a signal unit of a road network, wherein the signaling unit is one or more signal signs. The data structure comprises a grid with a plurality of grid cells (in particular with M×N grid cells) for a corresponding plurality of signal signs of a signaling unit. In this case, the grid cells can be designed (as described in this document) to represent corresponding signal signs of the signaling unit in a one-to-one assignment.

As already set out further above, the grid-based data structure enables efficient and precise description of signaling units. Furthermore, the data contained in the data structure can be processed in a precise and robust manner (for example in order to train a digital map and/or in order to provide a vehicle function). In this case, data comparisons between different grids can be carried out in an efficient and reliable manner individually for corresponding grid cells of the different grids.

The data structure can have individual data elements for the individual grid cells. It is possible for example to enter into a data element for a grid cell:
whether or not a signal sign is assigned to the grid cell; and/or
sign information in relation to the signal sign assigned to the grid cell.

The data structure can be designed (as set out within the context of the aforementioned assignment rules) in such a way that:
signal signs that are assigned to grid cells of a common column of the grid are offset along the horizontal direction at an offset less than or equal to an offset threshold value. The exact value of the offset does not typically result from this fact.
Signal signs that are assigned to grid cells in different columns of the grid are offset along the horizontal direction at an offset greater than the offset threshold value. The exact value of the offset does not typically result from this fact.

As an alternative or in addition, the data structure can be designed (as set out within the context of the aforementioned assignment rules) in such a way that:
signal signs that are assigned to grid cells of a common row of the grid are offset along the vertical direction at an offset less than or equal to an offset threshold value. The exact value of the offset does not typically result from this fact.
Signal signs that are assigned to grid cells in different rows of the grid are offset along the vertical direction at an offset greater than the offset threshold value. The exact value of the offset does not typically result from this fact.

The data structure, in particular the row and/or column assignment, can thus efficiently provide (relatively rough) information in relation to a spatial arrangement of the one or more signal signs of a signaling unit (in particular within a two-dimensional plane).

As already set out further above, the data structure can be designed to provide sign information for a signal sign assigned to a grid cell. The sign information can be provided within the data element of the respective grid cell. The sign information for a signal sign can indicate: the signaling state of the signal sign; and/or the association of the signal sign with a signal generator; and/or the function of the signal sign.

Another aspect describes a vehicle-external unit (and a corresponding method). The vehicle-external unit is configured to determine respective data relating to a signaling unit in a road network from a plurality of vehicles (for example to receive same via a communication link). In this case, the signaling unit can have one or more signal signs. In this case, the data can be provided in each case in the data structure described in this document.

The vehicle-external unit is furthermore configured to determine a reference grid with a plurality of grid cells on the basis of the data from the plurality of vehicles, the plurality of grid cells being used to represent one or more signal signs of the signaling unit. The reference grid can in this case have the same data structure as the data provided by the individual vehicles (that is to say as the signal sign grids provided by the individual vehicles).

Through the use of the data structure described in this document for uniform description of signaling units it is possible to train a digital map in which the signaling units are recorded in a particularly efficient, precise and robust manner.

Another aspect describes a (road motor vehicle (in particular a passenger vehicle or a commercial vehicle or a bus or a motorcycle) that comprises the device described in this document.

Another aspect describes a method for identifying and/or for representing a signaling unit that is arranged on a road on which a vehicle is traveling. The method involves determining a (spatial and/or two-dimensional) arrangement of one or more signal signs of the signaling unit on the basis of environmental data of one or more environmental sensors of the vehicle. Furthermore, the method involves assigning the one or more signal signs to one or more corresponding grid cells of a signal sign grid based on assignment logic. In this case, the grid cells can have a uniform edge length.

Another aspect describes a software (SW) program. The SW program may be configured to be executed on a processor (for example on a controller of a vehicle) in order thereby to execute the method described in this document.

Another aspect describes a storage medium. The storage medium may comprise an SW program that is designed to be executed on a processor in order thereby to execute the method described in this document.

It should be noted that the methods, devices and systems described in this document may be used both on their own and in combination with other methods, devices and systems described in this document. Furthermore, any aspects of the methods, devices and systems described in this document may be combined with one another in a wide variety of ways. The features of the claims may in particular be combined with one another in a wide variety of ways. Furthermore, features in parentheses are to be understood as optional features.

The invention is described in more detail below with reference to exemplary embodiments.

DETAILED DESCRIPTION OF THE DRAWINGS

As set out at the beginning, the present document deals with the reliable and precise identification and/or description of a signaling unit, in particular in order to increase the reliability, the availability and/or the convenience of a driving function, in particular of a driver assistance system, of a vehicle.

Figure 1:
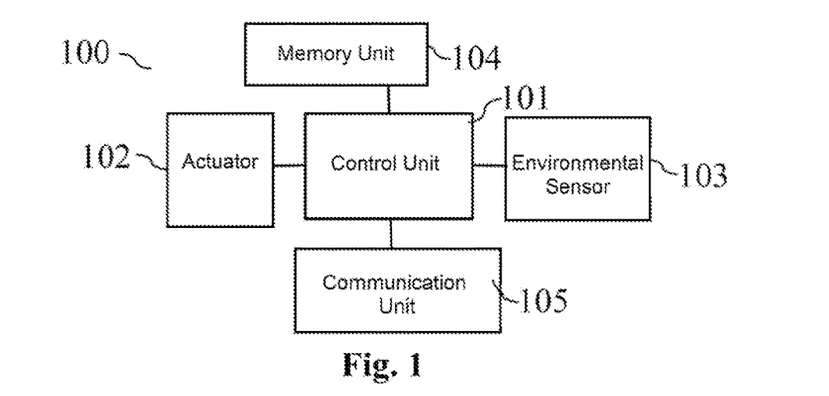
FIG. 1 shows exemplary components of a vehicle.

FIG. 1 shows exemplary components of a vehicle 100. The vehicle 100 comprises one or more environmental sensors 103 (for example one or more image cameras, one or more radar sensors, one or more Lidar sensors, one or more ultrasonic sensors, etc.) that are configured to acquire environmental data in relation to the environment of the vehicle 100 (in particular in relation to the environment in the driving direction ahead of the vehicle 100). Furthermore, the vehicle 100 can comprise one or more actuators 102 that are configured to act on the longitudinal and/or the transverse guidance of the vehicle 100. Exemplary actuators 102 are: a brake system, a drive motor, a steering system, etc.

The control unit 101 (also referred to as device in this document) can be configured to provide a driving function, in particular a driver assistance function, on the basis of the sensor data from the one or more environmental sensors 103 (that is to say on the basis of the environmental data). For example, an obstacle on the driving trajectory of the vehicle 100 can be identified on the basis of the sensor data. The control unit 101 can subsequently actuate one or more actuators 102 (for example the brake system) in order to decelerate the vehicle 100 in automated fashion and in order as a result to prevent a collision of the vehicle 100 with the obstacle.

In particular in the context of automated longitudinal guidance of a vehicle 100, in addition to a vehicle driving ahead, one or more signaling units (for example a light signal system and/or a traffic sign) on the lane or road on which the vehicle 100 is traveling can be taken into account. In this case, in particular the state of a light signal or traffic light system can be taken into account so that the vehicle 100 in automated fashion effects a deceleration up to the stop line of the traffic lights at a red traffic light relevant to its own (planned) driving direction and/or in automated fashion drives over the stop line of the traffic lights with a green traffic light.

Light signal systems can be designed in different ways in different countries and also have different degrees of complexity with respect to the driving direction/light signal assignment. Various driving directions can thus be controlled in a combined manner by a first group of signals or by a signal group and another direction can be controlled by another signal group. The repeating signals of a signal group can furthermore be located geographically at various points of a crossroad. It may therefore be difficult for a control unit 101 to identify on the basis of the sensor data which of the one or more signals (that is to say signal generators) of a light signal system at a crossroad are relevant to the planned driving direction of the vehicle 100 and which are not (in particular when the vehicle 100 is still at a relatively far distance from the light signal system). This document therefore describes a method and a data structure that make it possible to identify and/or to describe a signaling unit with one more different signal generators in a precise manner.

Figure 2A:
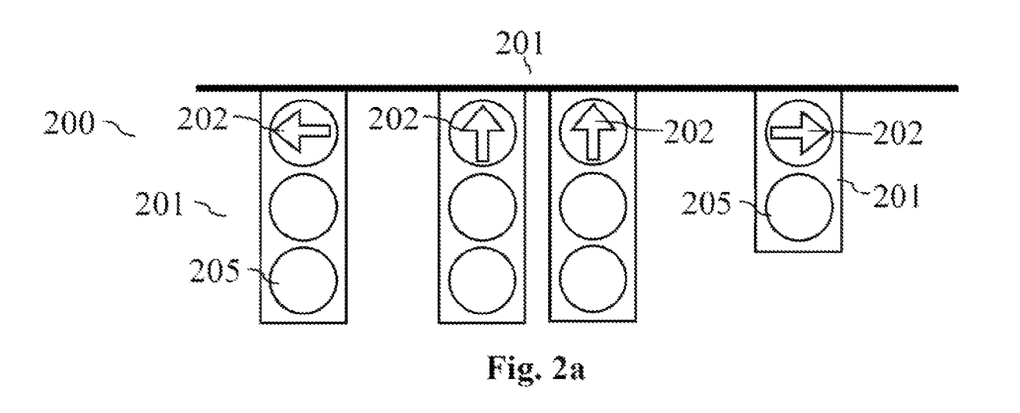
FIG. 2A shows an exemplary light signal system.

FIG. 2A shows an exemplary light signal system 200. The light signal system 200 illustrated in FIG. 2A has four different signal generators 201 that are arranged at different positions on an approach to a crossroad. The left-hand signal generator 201 has an arrow 202 to the left and thus indicates that this signal generator 201 applies to vehicles turning left. The two central signal generators 201 have an arrow 202 pointing upward (or no arrow 202) and thus indicate that these two signal generators 201 apply to travel straight ahead. The individual signal signs 205, in particular light signs, of these two signal generators 201 form signal groups. Furthermore, the right-hand signal generator 201 has an arrow 202 to the right and thus indicates that this signal generator 201 applies to vehicles turning right.

The light signal system 200 illustrated in FIG. 2A is only one example of many different possible configurations of a light signal system 200. A light signal system 200 can have a relatively large number of different forms of features. Exemplary features are:
  the number of signal generators 201 and/or signal signs 205;
  the positions of the one or more signal generators 201 and/or the one or more signal signs 205; and/or
  the assignment of a signal generator 201 and/or a signal sign 205 to a possible driving direction beyond a crossroad.

Figure 2B:
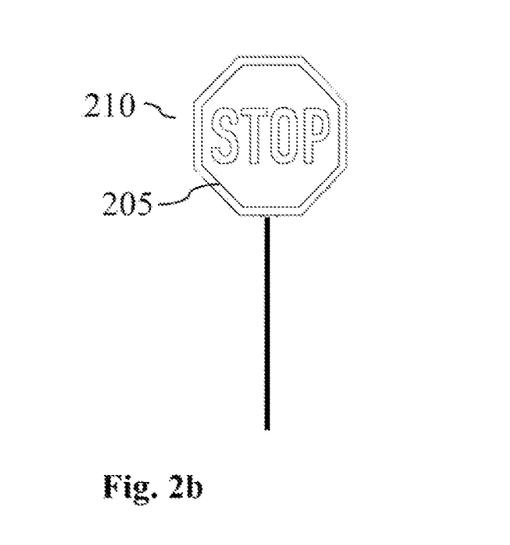
FIG. 2B shows an exemplary traffic sign.

FIG. 2B shows an exemplary stop sign as a traffic sign 210 that controls the right of way at a traffic junction, in particular at a crossroad. The control unit 101 of the vehicle 100 can be configured to identify a traffic sign 210, which is relevant to the right of way of the vehicle 100, on the road or lane on which the vehicle 100 is traveling on the basis of the sensor data from the one or more environmental sensors 103 (that is to say on the basis of the environmental data) and/or on the basis of digital map information (that is to say on map data).

Figure 3:
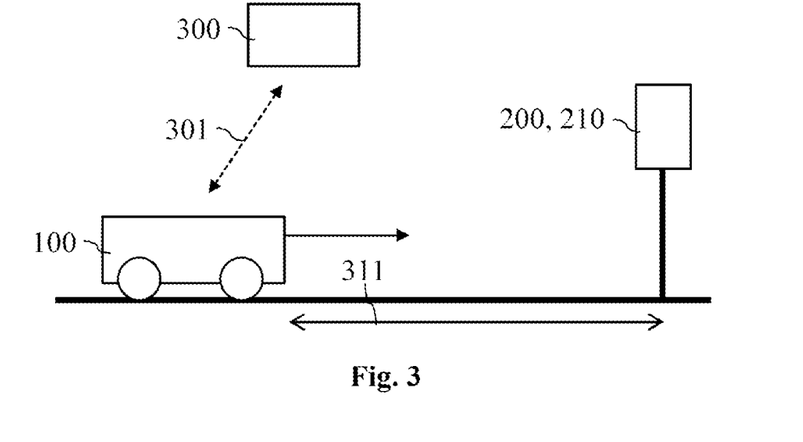
FIG. 3 shows an exemplary traffic situation.

FIG. 3 shows by way of example a vehicle 100 that is traveling on a road toward a signaling unit 200, 210 (in particular toward a light signal system 200 and/or toward a traffic sign 210). The one or more environmental sensors 103 of the vehicle 100 can be configured to acquire sensor data (in particular image data) in relation to the signaling unit 200, 210. The sensor data can then be analyzed (for example by means of an image analysis algorithm) in order to determine forms of one or more features of the signaling unit 200, 210. In particular, it is possible to determine on the basis of the sensor data whether the signaling unit 200, 210 is a light signal system 200 or a traffic sign 210. It is also possible to determine which signal generator 201 of the light signal system 200 is relevant to the (planned) driving direction of the vehicle 100. Furthermore, the (signaling) state of the relevant signal generator 201 (for example the color, for instance red, amber or green of a signal sign 205 of the relevant signal generator 201) can be determined.

The quality and/or the reliability with which the form of a feature of a signaling unit 200, 210 can be determined on the basis of the environmental data typically depend(s) on the distance 311 between the vehicle 100 and the signaling unit 200, 210. Furthermore, current weather conditions also typically have a substantial influence on the quality and/or the reliability of the determined form of a feature. In addition, the quality and/or reliability may be different for different features.

The vehicle 100 can have a memory unit 104 in which a digital map (that is to say map data) with respect to the road network on which the vehicle 100 is traveling is stored. Map data can indicate as attributes forms of one or more features of one or more signaling units 200, 210 in the road network. In particular, the map data for a light signal system 200 can indicate the assignment of the one or more signal generators 201 or signal groups to different possible driving directions or driving maneuvers. In other words, the map data can indicate which signal generator 201 is responsible for enabling which driving direction or driving maneuver. The map data can where applicable be received from a vehicle-external unit 300 on the vehicle 100 by means of a communication unit 105 of the vehicle 100 via a wireless communication link 301 (for example a WLAN or LTE communication link).

The control unit 101 of the vehicle 100 can be configured to determine (for example on the basis of the current position of the vehicle 100 and on the basis of a planned driving route and/or on the basis of the environmental data from the one or more environmental sensors 103) that the vehicle 100 is traveling toward a signaling unit 200, 210 lying ahead. Furthermore, the control unit 101 can determine the forms of one or more features of the signaling unit 200, 210 lying ahead on the basis of the (stored and/or received) map data. In particular, it is possible to determine on the basis of the map data which signal generator 201 or which signal group of a light signal system 200 is assigned to the current or planned driving direction of the vehicle 100. In addition, the current signaling state of the assigned signal generator 201 can be determined on the basis of the environmental data. Based on this, it is then possible to execute an automated driving function (for example an automated longitudinal guidance of the vehicle 100) in a reliable and convenient manner. In particular, by taking into account the map data, the forms of the one or more relevant features of a signaling unit 200 can be determined even at a relatively large distance 311 between the vehicle 100 and the signaling unit 200, as a result of which the reliability, the availability and the convenience of an automated driving function can be increased.

As set out at the beginning, a signaling unit 200, 210 at a junction can have a relatively high degree of complexity in relation to:
- the number of different signal generators 201 and/or signal signs 205; and/or
- the spatial arrangement of the different signal generators 201 and/or signal signs 205; and/or
- the function of the different signal generators 201 and/or signal signs 205; and/or
- the signaling state of the different signal generators 201 and/or signal signs 205.

The relatively wide variety of variants leads to class-based identification and/or representation of signaling units 200, 210 having a relatively low degree of reliability and/or robustness, in particular in relation to the evaluation of the (signaling) state of the signaling unit 200, 210. For example, given a relatively wide variety of variants, it is often not possible to reliably identify which signal generator 201 is relevant to the driving maneuver planned by a vehicle 100.

Figure 4A:
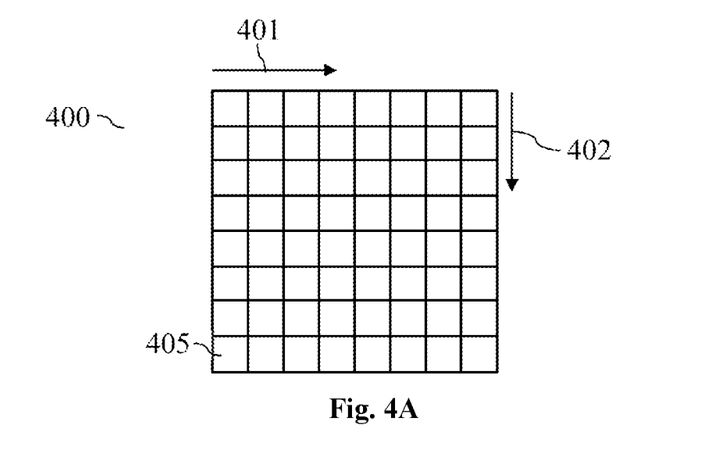
FIG. 4A shows an exemplary signal sign grid.

FIG. 4A shows an exemplary signal sign grid 400 that has a plurality of grid cells 405 for a corresponding plurality of different signal signs 205 of a signaling unit 200, 210 to be represented. The signal sign grid 400 has a particular number M (for example M=8) of grid cells 405 along the horizontal direction 401 and a particular number N (for example N=8) of grid cells 405 along the vertical direction 402. The grid cells 405 can be considered as entries in an M×N matrix.

Figure 4B:
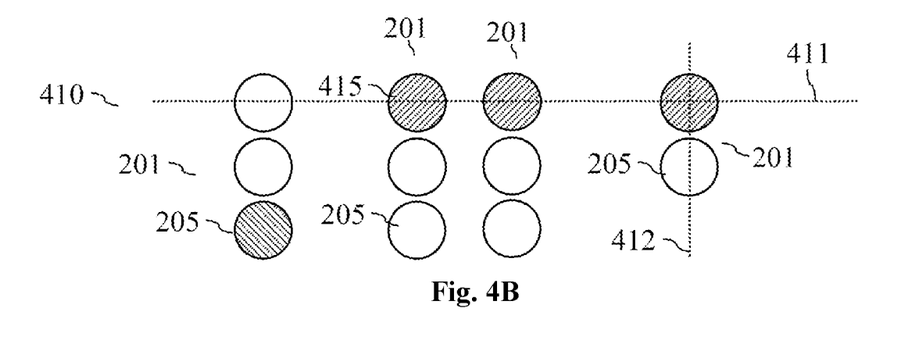
FIG. 4B shows an exemplary (planar) arrangement of signal signs.

The control unit 101 of the vehicle 100 can be configured to determine an arrangement of signal signs 205 on the basis of the environmental data from the one or more environmental sensors 103 of the vehicle 100. FIG. 4B shows an exemplary arrangement 410 (determined on the basis of the environmental data) of signal signs 205 for the signaling unit 200 illustrated in FIG. 2A. On the basis of the environmental data, it is possible to:
- identify the individual signal signs 205 (for example as round objects);
- identify the signaling state 415 of the individual signal signs 205 (for example active or inactive; and where applicable the signal color of an active signal sign 205); and/or
- determine the relative positioning of the individual signal signs 205 with respect to one another (in particular projected onto a two-dimensional plane); and/or
- determine where applicable information in relation to a function of the individual signal signs 205 and/or signal generators 201 (for example vehicles turning right, vehicles traveling straight on, vehicles turning left); this information can be determined for example on the basis of an identified arrow 202.

The determined arrangement 410 of signal signs 205 can in this case indicate values for the (horizontal and/or vertical) offset between the different signal signs 205.

The control unit 101 can be configured to assign the individual signal signs 205 of the identified arrangement 410 of signal signs 205 in each case to exactly one grid cell 405 of the signal sign grid 400. One or more assignment rules can be used for this purpose. In this case, each of the center points of the individual signal signs 205 can be taken into consideration. Exemplary assignment rules are:
- different signal signs 205 whose center points are arranged within the identified arrangement 410 along a vertical straight line 412 (for example with an offset that is less than an offset threshold value) are assigned to different grid cells 205 within the same column of the grid 400;

different signal signs 205 whose center points are arranged within the identified arrangement 410 along a horizontal straight line 411 (for example with an offset that is less than an offset threshold value) are assigned to different grid cells 205 within the same row of the grid 400;

different signal signs 205 whose center points are offset from one another in the horizontal direction 401 (for example with an offset that is greater than an offset threshold value) are each assigned to different columns of the grid 400;

different signal signs 205 whose center points are offset from one another in the vertical direction 402 (for example with an offset that is greater than an offset threshold value) are each assigned to different rows of the grid 400;

all signal signs 205 of the arrangement 410 of signal signs 205 are each assigned to exactly one vertical straight line 412 from a set of vertical straight lines 412, wherein the individual vertical straight lines 412 from the set of vertical straight lines 412 are arranged next to one another in a particular order; the individual vertical straight lines 412 from the set of vertical straight lines 412 are assigned to individual adjacent columns of the grid 400 according to the particular order in a one-to-one assignment; in this case, it is possible to start with the column of the grid 400 arranged furthest to the left; and/or all signal signs 205 of the arrangement 410 of signal signs 205 are each assigned to exactly one horizontal straight line 411 from a set of horizontal straight lines 411, wherein the individual horizontal straight lines 411 from the set of horizontal straight lines 411 are arranged next to one another in a particular order; the individual horizontal straight lines 411 from the set of horizontal straight lines 411 are assigned to individual adjacent rows of the grid 400 according to the particular order in a one-to-one assignment; in this case, it is possible to start with the topmost row of the grid 400.

Figure 4C:
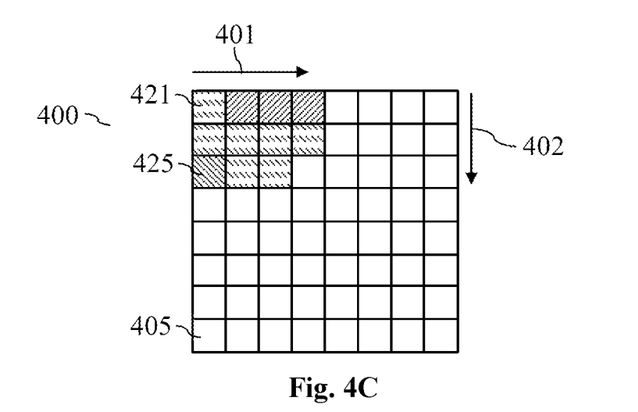
FIG. 4C shows an exemplary signal sign grid with sign information.

FIG. 4C shows an exemplary (filled) signal sign grid 400 that is used to describe and/or represent the signaling unit 200 from FIG. 2A. A grid cell 405 of the grid 400 can in each case indicate:

whether the grid cell 405 has been assigned a signal sign 205 or not; that is to say presence information 421 indicating whether the signaling unit 200 at the relative position corresponding to the grid cell 405 has a signal sign 205 or not; and/or state information 425 in relation to the identified signaling state 415 of the signal sign 205 that has been assigned to the grid cell 405 (for example active or inactive; and where applicable the signal color of the active signal sign 205); and/or functional information in relation to an identified function of the respective signal sign 205 (for example vehicles turning left, vehicles traveling straight ahead, vehicles turning right).

The signal sign grid 400 illustrated in FIG. 4C can be used to describe a signaling unit 200, 210 in a reliable and robust manner.

A digital map in relation to a road network can indicate the arrangement and/or the course of different roads and junctions between the different roads. A digital map of this type can be used for example in the context of a navigation system of the vehicle 100. The digital map can also be designed to indicate signaling units 200, 210 at different junctions of the road network. In particular, the digital map for a signaling unit 200, 210 at a junction can comprise signaling unit data which indicate for example:

the position, in particular the position of a reference point, of the signaling unit 200, 210 (for example in the form of GNSS (global navigation satellite system) coordinates);

the number and the relative positioning of the individual signal generators 201 and/or signal signs 205 with respect to one another; and/or the function of the individual signal generators 201 and/or signal signs 205 (for example vehicles turning left, vehicle traveling straight ahead, vehicles turning right).

Figure 4D:
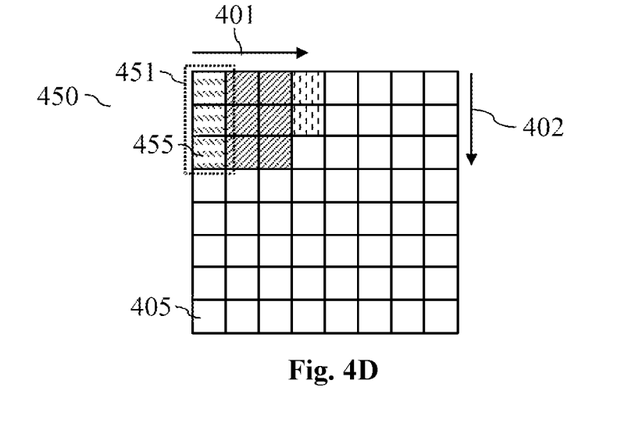
FIG. 4D shows an exemplary reference grid for a signaling unit.

The aforementioned information for a signaling unit 200, 201 can be provided within the signaling unit data at least partly in the grid form described in this document. The signaling unit data for a signaling unit 200, 210 can comprise in particular a reference grid 450 (that is to say a signal sign grid 400), such as is illustrated for example in FIG. 4D for the signaling unit 200 from FIG. 2A. The reference grid 450 can be designed according to the signal sign grid 400 described in connection with FIG. 4A. A grid cell 405 of the reference grid 450 can in each case indicate:

whether the signaling unit 200, 210 at the relative position corresponding to the grid cell 405 has a signal sign 205 or not;

the association 451 of the signal sign 205 with a determined signal group 201; and/or the function 455 of the signal sign 205 or the signal group 201 of the signal sign 205 (for example vehicles turning left, vehicles traveling straight ahead, vehicles turning right).

The control unit 101 of a vehicle 100 can be configured to transmit the signal sign grid 400, determined on the basis of the environmental data from the one or more environmental sensors 103 of the vehicle 100, for a particular signaling unit 200, 210 via a communication link 301 to a vehicle-external unit 300.

The vehicle-external unit 300 can be configured to draw a plurality of signal sign grids 400 from a corresponding plurality of different vehicles 100 for the particular signaling unit 200, 210. Based on this, it is then possible to determine in a robust manner (for example by averaging and/or by comparing the plurality of signal sign grids 400) the reference grid 450 for the particular signaling unit 200, 210 and provide same within a digital map (as signaling unit data). In a corresponding manner, reference grids 450 for different signaling units 200, 210 of a road network can be trained and provided within a digital map for the road network.

The control unit 101 of a vehicle 100 can be configured (for example in the context of a driver assistance function) to detect a signaling unit 200, 210 lying ahead on the basis of the environmental data from the one or more environmental sensors 103 and/or on the basis of a digital map. Furthermore, a signal sign grid 400 for the signaling unit 200, 210 lying ahead can be determined on the basis of the environmental data. The determined signal sign grid 400 can be compared with the reference grid 450 for the signaling unit 200, 210 lying ahead from the digital map. In this case, in particular the individual corresponding grid cells 405 of the two grids 400, 450 can be compared with one another in an efficient and reliable manner, for example in order to determine the function indicated in the digital map for a particular signal sign 205 or for a particular signal generator

201. The vehicle 100, in particular the driver assistance function, can then be operated in a particularly reliable and robust manner depending on the comparison between the determined signal sign grid 400 and the reference grid 450 from the digital map.

A module for detecting and assigning identified lights (that is to say signal signs 205) in a two-dimensional grid 400 is thus described. In this case, both active and inactive lights 205 can be identified. The lights 205 in the two-dimensional grid 400 are always assigned and positioned according to standard logic (with one or more assignment rules). The individual lights 205 in the two-dimensional grid 400 are represented preferably including the detected light properties 421, 425 such as for example status (on/off) and/or color (off, green, amber, red, blue). A standardized representation of traffic light types is thus made possible, where the representation is invariant with respect to the different light signal system types present worldwide.

Figure 5:
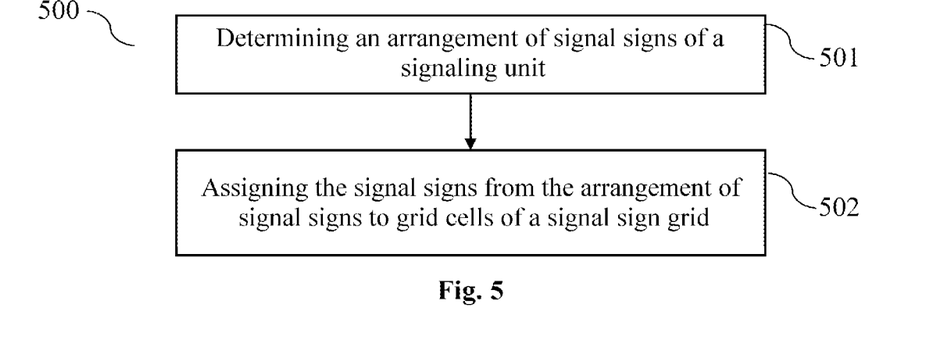
FIG. 5 shows a flow chart of an exemplary method for identifying and/or describing a signaling unit.

FIG. 5 shows a flowchart of a (possibly computer-implemented) method 500 for identifying and/or representing a signaling unit 200, 210, wherein the signaling unit 200, 210 is typically arranged on a road on which a vehicle 100 is traveling. The signaling unit 200, 210 can comprise in particular a light system 200 (with one or more traffic lights). The signaling unit 200, 210 comprises one or more signal signs 205, in particular lights. The method 500 can be executed by a control device 101 of the vehicle 100.

The method 500 involves determining 501 a (spatial or two-dimensional) arrangement 410 of one or more signal signs 205 of the signaling unit 200, 210, in particular on the basis of environmental data from one or more environmental sensors 103 of the vehicle 100. In particular, it is possible to determine how the different signal signs 205 are arranged relative to one another. The arrangement 410 can be determined for example based on image processing algorithms on the basis of camera images of a camera. The arrangement 410 can indicate the actual (horizontal and/or vertical) offsets between the different signal signs 205.

Furthermore, the method 500 involves assigning 502 the one or more signal signs 205 to one or more corresponding grid cells 405 of a signal sign grid 400 based on assignment logic. In this case, there is preferably a one-to-one assignment of signal signs 205 to grid cells 405, such that a grid cell 405 represents at most exactly one signal sign 205. The assignment logic can comprise one or more of the assignment rules described in this document. The determined signal sign grid 400 can be used to provide a vehicle function and/or to train a digital map.

The measures described in this document can be used to determine, represent and compare information in relation to signaling units 200, 210 in a reliable and robust manner, in particular in order to increase the quality of vehicle functions.

The present invention is not restricted to the exemplary embodiments shown. In particular, it should be noted that the description and the figures are intended to illustrate only the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for identifying and/or describing a signaling unit that is arranged on a road on which a vehicle is traveling, comprising:
a control unit operatively configured to:
determine an arrangement of a plurality of signal signs of the signaling unit based on environmental data from one or more environmental sensors of the vehicle;
assign the signal signs to corresponding grid cells of a signal sign grid based on assignment logic in accordance with positions of the signal signs in the determined arrangement; and
provide a vehicle function for at least partly automated guidance of the vehicle, on the basis of the signal sign grid for the signaling unit,
wherein the signal sign grid comprises:
a number M of columns, where M≥5; and
a number N of rows, where N≥5.

2. The device according to claim 1, wherein
the control unit is configured to assign a subset of the signal signs along a horizontal direction to a set of columns of the signal sign grid.

3. The device according to claim 2, wherein
the control unit is configured to assign the subset of the signal signs along the horizontal direction to the set of columns of the signal sign grid such that, for all signal signs in the determined arrangement, it holds true that:
signal signs that are offset from one another along the horizontal direction with an offset less than or equal to an offset threshold value are assigned to the same column; and
signal signs that are offset from one another along the horizontal direction with an offset greater than the offset threshold value are assigned to different columns.

4. The device according to claim 2, wherein
the control unit is configured to assign the subset of the signal signs along the horizontal direction to the set of columns of the signal sign grid such that:
a signal sign that is arranged furthest to the left along the horizontal direction is assigned to a first column of the signal sign grid; or
a signal sign that is arranged furthest to the right along the horizontal direction is assigned to a last column of the signal sign grid.

5. The device according to claim 2, wherein
the control unit is configured to assign the subset of the signal signs along the horizontal direction to the set of columns of the signal sign grid such that the signal signs are assigned to different, directly adjacent columns of the signal sign grid according to an order in which the signal signs are offset from one another along the horizontal direction.

6. The device according to claim 1, wherein
the control unit is configured to assign a subset of the signal signs along a vertical direction to a set of rows of the signal sign grid.

7. The device according to claim 6, wherein
the control unit is configured to assign the subset of the signal signs along the vertical direction to the set of rows of the signal sign grid such that, for all signal signs in the determined arrangement, it holds true that:
signal signs that are offset from one another along the vertical direction with an offset less than or equal to an offset threshold value are assigned to the same row; and signal signs that are offset from one another along the vertical direction with an offset greater than the offset threshold value are assigned to different rows.

8. The device according to claim 6, wherein the control unit is configured to assign the subset of the signal signs along the vertical direction to the set of rows of the signal sign grid such that:
a signal sign that is arranged furthest to the top along the vertical direction is assigned to a first row of the signal sign grid; or
a signal sign that is arranged furthest to the bottom along the vertical direction is assigned to a bottom-most row of the signal sign grid.

9. The device according to claim 6, wherein the control unit is configured to assign the subset of the signal signs along the vertical direction to the set of rows of the signal sign grid such that the signal signs are assigned to different, directly adjacent rows of the signal sign grid according to an order in which the signal signs are offset from one another along the vertical direction.

10. The device according to claim 1, wherein the control unit is configured to assign each signal sign in the determined arrangement to exactly one grid cell of the signal sign grid in a one-to-one assignment.

11. The device according to claim 1, wherein the control unit is configured, for a signal sign in the determined arrangement of the signal signs, to:
determine sign information on the basis of the environmental data, wherein the sign information indicates at least one of:
(i) a signaling state of the signal sign;
(ii) an association of the signal sign to a signal generator; or
(iii) a function of the signal sign; and
store the sign information together with the grid cell of the signal sign in the signal sign grid.

12. The device according to claim 1, wherein at least one of:
(i) the signaling unit comprises one or more signal generators each having one or more signal signs;
(ii) a signal generator is associated with a function for vehicles turning left, vehicles turning right and/or vehicles traveling straight ahead;
(iii) the signaling unit comprises a light signal system; or
(iv) a signal sign is a light of a light signal system.

13. The device according to claim 1, wherein the control unit is configured to transmit the signal sign grid for the signaling unit to a vehicle-external unit for training a digital map in relation to different signaling units in a road network.

14. The device according to claim 1, wherein the control unit is configured to:
compare the signal sign grid for the signaling unit with a reference grid for the signaling unit from a digital map in relation to a road network on which the vehicle is traveling; and
provide the vehicle function depending on the comparison.

15. A data structure for representing a signaling unit of a road network, the signaling unit having a plurality of signal signs; the data structure comprising:
a data structure grid with a plurality of grid cells for a corresponding plurality of the signal signs of the signaling unit;
wherein the grid cells are designed to represent the corresponding signal signs of the signaling unit in a one-to-one assignment,
wherein the data structure is configured to provide a vehicle function for at least partly automated guidance of the vehicle, and
wherein the data structure is configured such that:
signal signs that are assigned to grid cells of a common column of the grid are offset along a horizontal direction at an offset less than or equal to an offset threshold value; and
signal signs that are assigned to grid cells in different columns of the grid are offset along the horizontal direction at an offset greater than the offset threshold value;
and/or
signal signs that are assigned to grid cells of a common row of the grid are offset along a vertical direction at an offset less than or equal to an offset threshold value; and
signal signs that are assigned to grid cells in different rows of the grid are offset along the vertical direction at an offset greater than the offset threshold value.

16. The data structure according to claim 15, wherein the data structure is configured to provide sign information for a signal sign assigned to a grid cell; and
the sign information for a signal sign indicates at least one of:
(i) a signaling state of the signal sign;
(ii) an association of the signal sign to a signal generator; or
(iii) a function of the signal sign.

17. A method for identifying and/or representing a signaling unit that is arranged on a road on which a vehicle is traveling, the method comprising:
determining an arrangement of a plurality of signal signs of the signaling unit based on environmental data of one or more environmental sensors of the vehicle;
assigning the signal signs to corresponding grid cells of a signal sign grid based on assignment logic in accordance with positions of the signal signs in the determined arrangement; and
providing a vehicle function for at least partly automated guidance of the vehicle, on the basis of the signal sign grid for the signaling unit,
wherein the signal sign grid comprises:
a number M of columns, where $M \geq 5$; and
a number N of rows, where $N \geq 5$.

* * * * *